United States Patent
Zhou et al.

(10) Patent No.: US 11,892,588 B1
(45) Date of Patent: Feb. 6, 2024

(54) METHOD AND SYSTEM FOR TRANSIENT ELECTROMAGNETIC-INDUCED POLARIZATION FIELD SEPARATION AND MULTI-PARAMETER INFORMATION EXTRACTION

(71) Applicant: Institute of Geology and Geophysics, Chinese Academy of Sciences, Beijing (CN)

(72) Inventors: Nannan Zhou, Beijing (CN); Shun Zhang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/362,573

(22) Filed: Jul. 31, 2023

(30) Foreign Application Priority Data

Nov. 8, 2022 (CN) .......................... 202211389648.3

(51) Int. Cl.
  *G01V 3/12* (2006.01)
  *G01V 3/38* (2006.01)
(52) U.S. Cl.
  CPC . *G01V 3/38* (2013.01); *G01V 3/12* (2013.01)
(58) Field of Classification Search
  CPC . G01V 1/38; G01V 1/48; G01V 1/003; G01V 1/286; G01V 1/36; G01V 3/12; G01V 3/083; G01V 3/06; G01V 3/105; G01V 3/30; G01V 3/10; G01V 3/24; G01V 3/28; G01V 2210/6163; G01V 99/005
  USPC ......... 324/334; 356/432; 702/189, 19, 2, 23, 702/57, 7, 1, 179, 32, 190; 703/2
  See application file for complete search history.

(56) References Cited

U.S. PATENT DOCUMENTS

| 8,138,763 B2 * | 3/2012 | Legeydo | ................ G01V 3/083 |
| | | | 324/362 |
| 2021/0341638 A1* | 11/2021 | Zhou | ...................... G01V 3/083 |

FOREIGN PATENT DOCUMENTS

| AU | 2020101013 A4 | 7/2020 | |
| CN | 102053281 A | 5/2011 | |
| CN | 102265188 A * | 11/2011 | ............... G01V 3/38 |

(Continued)

OTHER PUBLICATIONS

First Office Action for China Application No. 202211389648.3, dated Apr. 28, 2023.

(Continued)

*Primary Examiner* — Jeffrey P Aiello
(74) *Attorney, Agent, or Firm* — Pilloff Passino & Cosenza LLP; Sean A. Passino; Rachel K. Pilloff

(57) ABSTRACT

Provided are a method and a system for transient electromagnetic-induced polarization field separation and multi-parameter information extraction. The method includes the following steps: obtaining electromagnetic data influenced by an induced polarization effect; performing a separating treatment of an induced polarization field and an electromagnetic field on the electromagnetic data influenced by the induced polarization effect to obtain a pure electromagnetic response field and a pure induced polarization response field; based on the pure electromagnetic response field and the pure induced polarization response field, respectively performing a multi-parameter information inversion to complete an extraction of geoelectric parameters. This system includes a data obtaining module, a field separation module and a parameter inversion module.

8 Claims, 18 Drawing Sheets

(56) References Cited

FOREIGN PATENT DOCUMENTS

| | | | | | |
|---|---|---|---|---|---|
| CN | 102265188 | A | | 11/2011 | |
| CN | 105893678 | A | | 8/2016 | |
| CN | 110376651 | A * | 10/2019 | ............. G01V 3/082 |
| CN | 110673218 | A | | 1/2020 | |
| CN | 112346132 | A * | 2/2021 | ............. G01V 3/083 |
| CN | 112699596 | A | | 4/2021 | |
| CN | 113204054 | A | | 8/2021 | |
| CN | 113568056 | A | | 10/2021 | |
| CN | 114386464 | A | | 4/2022 | |
| CN | 114839673 | A | | 8/2022 | |
| CN | 217278970 | U * | 8/2022 | |
| CN | 115016008 | A | | 9/2022 | |
| CN | 115047531 | A | | 9/2022 | |
| WO | 2008024581 | A2 | | 2/2008 | |
| WO | WO-2021042952 | A1 * | 3/2021 | ............. G01V 3/083 |

OTHER PUBLICATIONS

First Office Action for China Application No. 202211389648.3, dated May 12, 2023.
Nannan Zhou et al., "Comparison of semi-airborne transient electromagnetic data from double-line and single-line grounded-wire sources," Journal of Applied Geophysics, Jan. 12, 2022, vol. 197.

* cited by examiner

| Depth (m) | Geologic column | Lithology |
|---|---|---|
| | | Sedimentary tuff |
| -100 | | Carbonaceous sedimentary tuff |
| | | Sedimentary tuff |
| -200 | | |
| -300 | | Gabbro-diorite |
| -400 | | |

FIG. 13

METHOD AND SYSTEM FOR TRANSIENT ELECTROMAGNETIC-INDUCED POLARIZATION FIELD SEPARATION AND MULTI-PARAMETER INFORMATION EXTRACTION

CROSS-REFERENCE TO RELATED APPLICATIONS

This application claims priority to Chinese Patent Application No. 202211389648.3, filed on Nov. 8, 2022, the contents of which are hereby incorporated by reference.

TECHNICAL FIELD

The application belongs to the technical field of multi-parameter electrical information inversion of underground structures, and in particular to a method and a system for transient electromagnetic-induced polarization field separation and multi-parameter information extraction.

BACKGROUND

Based on the law of electromagnetic induction, the transient electromagnetic method realizes the detection of underground targets according to the resistivity difference of underground structures. Transient electromagnetic exploration is widely used in the detecting and exploring metal mineral resources, oil and gas resources, underground cavities and urban underground spaces with the advantages of high resolution, high efficiency, large depth and low cost.

In exploring the metal mineral resources, especially in exploring concealed ore bodies, the transient electromagnetic method plays an increasingly important role because of the advantages in underground nondestructive exploration. However, when there are low resistivity and high polarization bodies underground, such as sulfide minerals and carbonaceous tuff, the induced polarization effects will affect the electromagnetic induction field, resulting in the distortion of electromagnetic data and even the sign inversion. These phenomena increase the difficulty of electromagnetic data inversion. In the early inversion stage, people usually remove the electromagnetic data influenced by the induced polarization effect as noise, but this may also remove the data containing useful information, which affects the authenticity and credibility of inversion interpretation. With the introduction of Cole-Cole model, scholars begin to inverse resistivity and polarizability information at the same time, but this method has a large amount of calculation and is limited to one-dimensional inversion at present. At present, a popular inversion algorithm is to obtain the underground resistivity structure by three-dimensional inversion by using the early data which are less influenced by the induced polarization effect, and then to obtain the pure electromagnetic response by three-dimensional forward modelling by using the resistivity information obtained by the inversion, and to subtract the pure electromagnetic response from the observed data to obtain the pure induced polarization response, and further to obtain the information such as polarization rate by the inversion of the pure induced polarization response. However, this method needs to undergo many three-dimensional forward and inversion calculations, which has a large amount of calculation. Moreover, the early data measured in the field may also contain the induced polarization response, so this method is not suitable for all underground structure inversions.

SUMMARY

In order to solve the above technical problems, the application provides a field separation-multi-parameter inversion method for electro-magnetic data containing induced polarization response based on deep learning, and based on a deep neural network, the field separation and multi-parameter information inversion are realized in turn, and the field separation of the original data that may not be realized by the conventional method is realized, and then the pure electromagnetic field and induced polarization field response obtained by the extraction are inverted, so that the inversion complexity is reduced and the inversion efficiency is improved.

In order to achieve the above objective, the application provides a method for transient electromagnetic-induced polarization field separation and multi-parameter information extraction, including the following steps:

S1, obtaining electromagnetic data influenced by an induced polarization effect, where the electromagnetic data influenced by the induced polarization effect is induced polarization-electromagnetic field data;

S2, performing a separating treatment of an induced polarization field and an electromagnetic field on the electromagnetic data influenced by the induced polarization effect to obtain a pure electromagnetic response field and a pure induced polarization response field;

and S3, based on the pure electromagnetic response field and the pure induced polarization response field, respectively performing a multi-parameter information inversion to complete an extraction of geoelectric parameters, where the geoelectric parameters include a predicted layer thickness, a predicted resistivity and a predicted polarizability;

Optionally, in the S2, the method of separating treatment of the induced polarization field and the electromagnetic field includes:

constructing a first convolutional neural network;

obtaining the pure electromagnetic response field by a separation from the induced polarization-electromagnetic field data based on the first convolutional neural network;

subtracting the pure electromagnetic response field from the induced polarization-electromagnetic field data to obtain the pure induced polarization response field, and completing the separating treatment of the induced polarization field and the electromagnetic field.

Optionally, the first convolutional neural network has seven layers, where a first layer is Conv1d+ReLU (Rectified Linear Function), second to sixth layers are Conv1d+BN (Batch Normalization)+ReLU, and a seventh layer is Conv1d;

numbers of convolution kernels in a one-dimensional convolution layer from the first layer to the sixth layer of the first convolutional neural network are all 64, convolution kernel lengths are all 3, convolution step lengths are all 1, and dilation step lengths are all 1;

a number of the convolution kernels in the seventh layer of the first convolutional neural network is 1, the convolution kernels length is 3, the convolution step length is 1, and the dilation step length is 1.

Optionally, in the S3, a method for performing the multi-parameter information inversion includes:

constructing a second convolutional neural network and a third convolutional neural network;

obtaining the predicted layer thickness and the predicted resistivity based on the pure electromagnetic response field and the second convolutional neural network;

obtaining the predicted layer thickness and the predicted polarizability based on the pure induced polarization response field and the third convolutional neural network.

Optionally, the structures of the second convolutional neural network and the third convolutional neural network are same, where first to fifth layers are all Conv1d+ReLU, and a sixth layer is MLP;

numbers of the convolution kernels from the first layer to the fifth layer of the second convolutional neural network and the third convolutional neural network are 64, 32, 16, 8 and 4 in sequence, and the step lengths are all 1, and the dilation lengths are all 1.

On the other hand, in order to achieve the above objectives, the application also provides a system for transient electromagnetic-induced polarization field separation and multi-parameter information extraction, including a data obtaining module, a field separation module and a parameter inversion module;

the data obtaining module is used for obtaining electromagnetic data influenced by an induced polarization effect, and the electromagnetic data influenced by the induced polarization effect is induced polarization-electromagnetic field data;

the field separation module is used for performing a separating treatment of an induced polarization field and an electromagnetic field on the electromagnetic data influenced by the induced polarization effect to obtain a pure electromagnetic response field and a pure induced polarization response field;

the parameter inversion module is used for respectively performing a multi-parameter information inversion based on the pure electromagnetic response field and the pure induced polarization response field to complete an extraction of geoelectric parameters, where the geoelectric parameters include a predicted layer thickness, a predicted resistivity and a predicted polarizability.

Optionally, the field separation module includes a first convolutional neural network unit and a separation unit;

the first convolutional neural network unit is used for obtaining the pure electromagnetic response field by a separation from the induced polarization-electromagnetic field data;

the separation unit is used for subtracting the pure electromagnetic response field from the induced polarization-electromagnetic field data to obtain the pure induced polarization response field.

Optionally, a first convolutional neural network is arranged in the first convolutional neural network unit;

the first convolutional neural network has seven layers, where a first layer is Conv1d+ReLU, second to sixth layers are Conv1d+BN+ReLU, and a seventh layer is Conv1d;

numbers of convolution kernels in a one-dimensional convolution layer from the first layer to the sixth layer of the first convolutional neural network are all 64, convolution kernel lengths are all 3, convolution step lengths are all 1, and dilation step lengths are all 1;

a number of the convolution kernels in the seventh layer of the first convolutional neural network is 1, the convolution kernels length is 3, the convolution step length is 1, and the dilation step length is 1.

Optionally, the parameter inversion module includes a second convolutional neural network unit and a third convolutional neural network unit;

a second convolutional neural network is arranged in the second convolutional neural network unit, and the second convolutional neural network unit is used for obtaining the predicted layer thickness and the predicted resistivity based on the pure electromagnetic response field and the second convolutional neural network;

a third convolutional neural network is arranged in the third convolutional neural network unit, and the third convolutional neural network unit is used for obtaining the predicted layer thickness and the predicted polarizability based on the pure induced polarization response field and the third convolutional neural network.

Optionally, the structures of the second convolutional neural network and the third convolutional neural network are same, where first to fifth layers are all Conv1d+ReLU, numbers of the convolution kernels are 64, 32, 16, 8 and 4 in sequence, and the step lengths are all 1, and the dilation lengths are all 1; the sixth layer is MLP.

Compared with the prior art, the application has the following advantages and technical effects.

Firstly, the improved method provided by the application has fast convergence speed and good effect, and the convergence of the error is good.

Secondly, the prediction accuracy of this method is high, and the electromagnetic field and induced polarization field separated by the neural network are very consistent with the actual electromagnetic field and induced polarization field; the field separation-multi-parameter inversion framework may accurately inverse the physical parameters and shape parameters of the low-resistance polarization layer.

Thirdly, this method is also excellent in processing the measured data. The framework realizes the separation of electromagnetic field and induced polarization field, and inverses the low-resistivity polarization layer, which is consistent with the drilling formation information.

BRIEF DESCRIPTION OF THE DRAWINGS

In order to explain the technical scheme of the application more clearly, the drawings needed in the embodiments are briefly introduced below. Obviously, the drawings in the following description are only some embodiments of the application. For ordinary technicians in the field, other drawings may be obtained according to these drawings without paying creative labor.

FIG. 13 is a schematic diagram of actual drilling formation information in the Embodiment 3 of the present application.

DETAILED DESCRIPTION OF THE EMBODIMENTS

Figure 1:
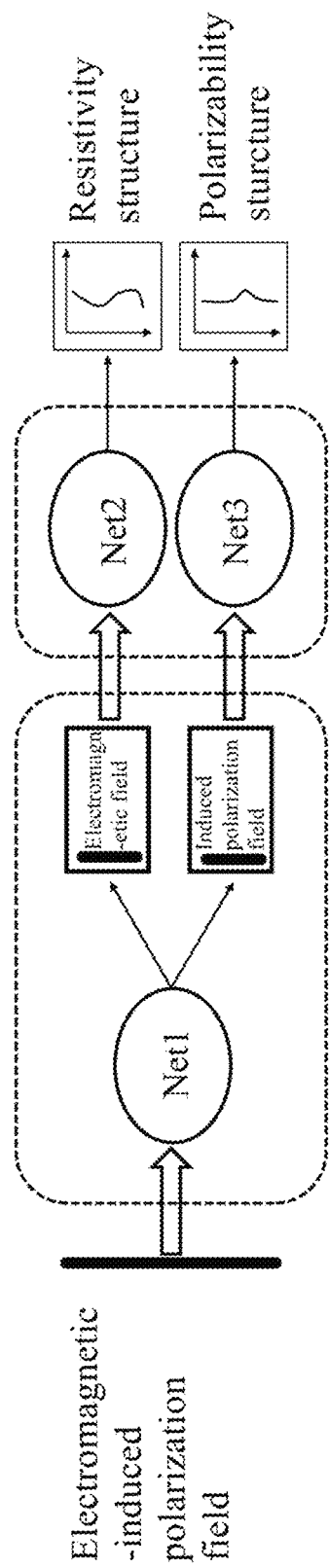
FIG. 1 is a flow diagram of a method for transient electromagnetic-induced polarization field separation and multi-parameter information extraction according to the Embodiment 1 of the present application.

Considering the complexity and difficulty of electromagnetic data inversion influenced by the induced polarization effect, the application provides a field separation-multi-parameter inversion method for electromagnetic data containing induced polarization response based on the deep learning. This method is mainly divided into two parts.

In the first part, the induced polarization field and electromagnetic field are separated from the electromagnetic data influenced by induced polarization effect, and the pure electromagnetic field response and the pure induced polarization response are obtained. The physical theories of induced polarization field and electromagnetic field are induced polarization effect and law of electromagnetic induction respectively, and the distorted electromagnetic field is the superposition of these two fields, which provides theoretical support for realizing field separation from response data, but this may not be solved by conventional methods at present. Therefore, the application proposes a method to realize field separation based on the deep neural network.

The second part is to realize the inversion of multi-parameter information. Using the pure electromagnetic response and pure induced polarization response extracted in the first part, two deep neural networks are constructed respectively to realize the inversion of resistivity information and polarizability information respectively.

In the following, the technical scheme in the embodiment of the application will be clearly and completely described with reference to the drawings in the embodiment of the application. Obviously, the described embodiment is only a part of the embodiment of the application, but not the whole embodiment. Based on the embodiments in this application, all other embodiments obtained by ordinary technicians in this field without creative work belong to the protection scope of this application.

In order to make the above-mentioned objectives, features and advantages of this application more obvious and easier to understand, the application will be further described in detail with the drawings and specific implementation methods.

Embodiment 1:

The electromagnetic response data influenced by the induced polarization effect not only obeys the law of electromagnetic induction, which increases the difficulty and reliability of inversion. Therefore, a method for transient electromagnetic-induced polarization field separation and multi-parameter information extraction is proposed in the Embodiment 1. Firstly, induced polarization-electromagnetic field is separated to obtain the pure electromagnetic response field and the pure induced polarization response field respectively. In this way, the two fields obey the law of electromagnetic induction and the induced polarization effect respectively, which reduces the difficulty of inversion. Then, the deep neural network inversion is performed on the two extracted fields, and the underground resistivity structure and underground polarizability structure are obtained respectively.

FIG. 1 is a flow diagram of a method for transient electromagnetic-induced polarization field separation and multi-parameter information extraction according to the Embodiment 1, which mainly includes the following steps.

S1, obtaining electromagnetic data influenced by the induced polarization effect. The electromagnetic data influenced by the induced polarization effect are taken as the induced polarization-electromagnetic field data to be processed in the application. In the application, by constructing a layered geoelectric model with a polarization layer, adopting a grounded conductor source transient electromagnetic device and introducing a Cole-Cole polarization model, firstly, frequency domain electromagnetic data are calculated, and then the frequency domain data are converted into a time domain through cosine transform, so as to obtain transient electromagnetic data influenced by induced polarization, which is the electromagnetic data influenced by the induced polarization effect.

S2, performing a separating treatment of the induced polarization field and the electromagnetic field on the electromagnetic data influenced by the induced polarization effect to obtain a pure electromagnetic response field and a pure induced polarization response field.

In this embodiment, induced polarization-electromagnetic field data is recorded as EMIP, and pure electromagnetic response field and pure induced polarization response field are recorded as EM and IP respectively. According to the electromagnetic induction principle and the induced polarization effect, the following is obtained:

$$EMIP = EM + IP \quad (1)$$

Due to the different geoelectric models have different EMIP, EM and IP, the mappings from EMIP to EM or from EMIP to IP are nonlinear. In this embodiment, the two mappings are recorded as $F_1(x)$ and $F_2(x)$ respectively, satisfying:

$$EM = F_1(EMIP) \quad (2)$$

$$IP = F_2(EMIP) \quad (3)$$

Since EM and IP satisfy formula (1), the separation of induced polarization-electromagnetic field may be realized as long as one of the two mappings is learned. In this embodiment, mapping $F_1$ (x) is selected as the mapping to be learned, and EM is obtained from EMIP by formula (2), and IP is obtained by formula (1) to realize field separation.

Figure 2:
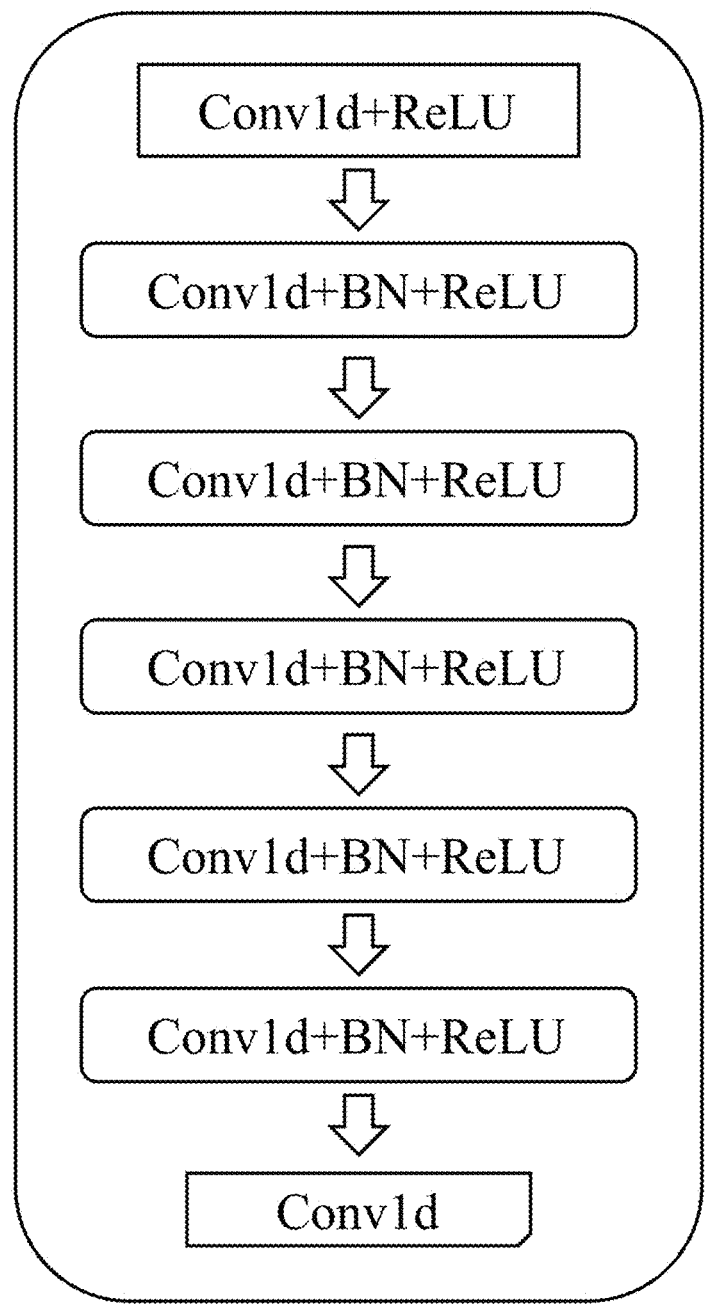
FIG. 2 is a schematic structural diagram of the first convolutional neural network in the Embodiment 1 of the present application.

In order to acquire highly nonlinear mapping $F_1$ (x), in this embodiment, the first convolutional neural network Net1 is constructed, the structure of which is shown in FIG. 2, and the basic idea is to use neural networks to fit these nonlinear mappings to the greatest extent. Because the electromagnetic-induced polarization response is one-dimensional data, in this embodiment, its sampling time points are 30, and the shape is (1×30). Therefore, the one-dimensional convolution layer is selected as the main construction layer in this embodiment. As shown in FIG. 2, the first layer is a one-dimensional convolution layer, and in order to extract more information from EMIP, the number of convolution kernels is set to 64; the length of convolution kernel is set to 3, and in order to keep the length of data unchanged, the step length is set to 1, and the dilation length is selected to 1; meanwhile, in order to improve the representational capacity of Net1 to nonlinearity, a linear rectification function ReLU is used to process the output of one-dimensional convolution layer, and finally the data with the shape of (64×30) are obtained. The extracted features are continuously input to the next layer of the neural network. For the second to sixth layers, the structures are same, and are all Conv1d+BN+ReLU. The number of the convolution kernels in one-dimensional convolution layer is 64 and the length is 3; the convolution step length is 1 and the dilation length is 1. BN layer may normalize the data, and adding BN layer may improve the training speed and reduce the time cost. Each layer will output data with the shape of (64×30). The last layer is convolution layer. Because the length of the electromagnetic field EM is the same as that of the induced polarization-electromagnetic field, and the shape is (1×30), in order to ensure that the output data shape of the last convolution layer is (1×30), the number of convolution kernels of the last layer is selected to be 1, and other parameters are the same as those of other layers, so that the output with the shape of (1×30) may be obtained, that is, the predicted electromagnetic field, and that is, the pure electromagnetic response field, which is recorded as $\widehat{EM}$;

$$\widehat{EM} = \text{Net1}(w, EMIP) \quad (4)$$

where w is the parameter matrix to be learned. The neural network is trained on the training set 1, and the parameter matrix w is constantly updated by using the error back propagation algorithm, so that the error between the electromagnetic field $\widehat{EM}$ predicted by the first neural network and the actual pure electromagnetic field EM may meet the requirements, that is, the formula (4) may fit the mapping $F_1$ (x) to a great extent. Further, the predicted induced polarization field, that is, the pure induced polarization response field, is obtained by using formula (1), which is recorded as $\widehat{IP}$.

$$\widehat{IP} = EMIP - \widehat{EM} = EMIP - \text{Net1}(w, EMIP) \quad (5)$$

This formula may fit the mapping $F_2$ (x) to a great extent, so as to separate the induced polarization field and electromagnetic field from the induced polarization-electromagnetic field.

S3, based on the pure electromagnetic response field and the pure induced polarization response field, respectively acquiring the mappings between electromagnetic field and resistivity and layer thickness, and between induced polarization field and polarizability and layer thickness, and carrying out multi-parameter information inversion to complete the extraction of geoelectric parameters, that is, predicted layer thickness, predicted resistivity and predicted polarization.

In this embodiment, the mapping between the electromagnetic field and resistivity and layer thickness is recorded as $F_3$ (x), and the mapping between the induced polarization field and polarizability and layer thickness is $F_4$ (x).

$$(\rho, h) = F_3(EM) \quad (6)$$

$$(m, h) = F_4(IP) \quad (7)$$

where ρ represents the predicted resistivity, h is the layer thickness and m is the polarizability.

Figure 3:
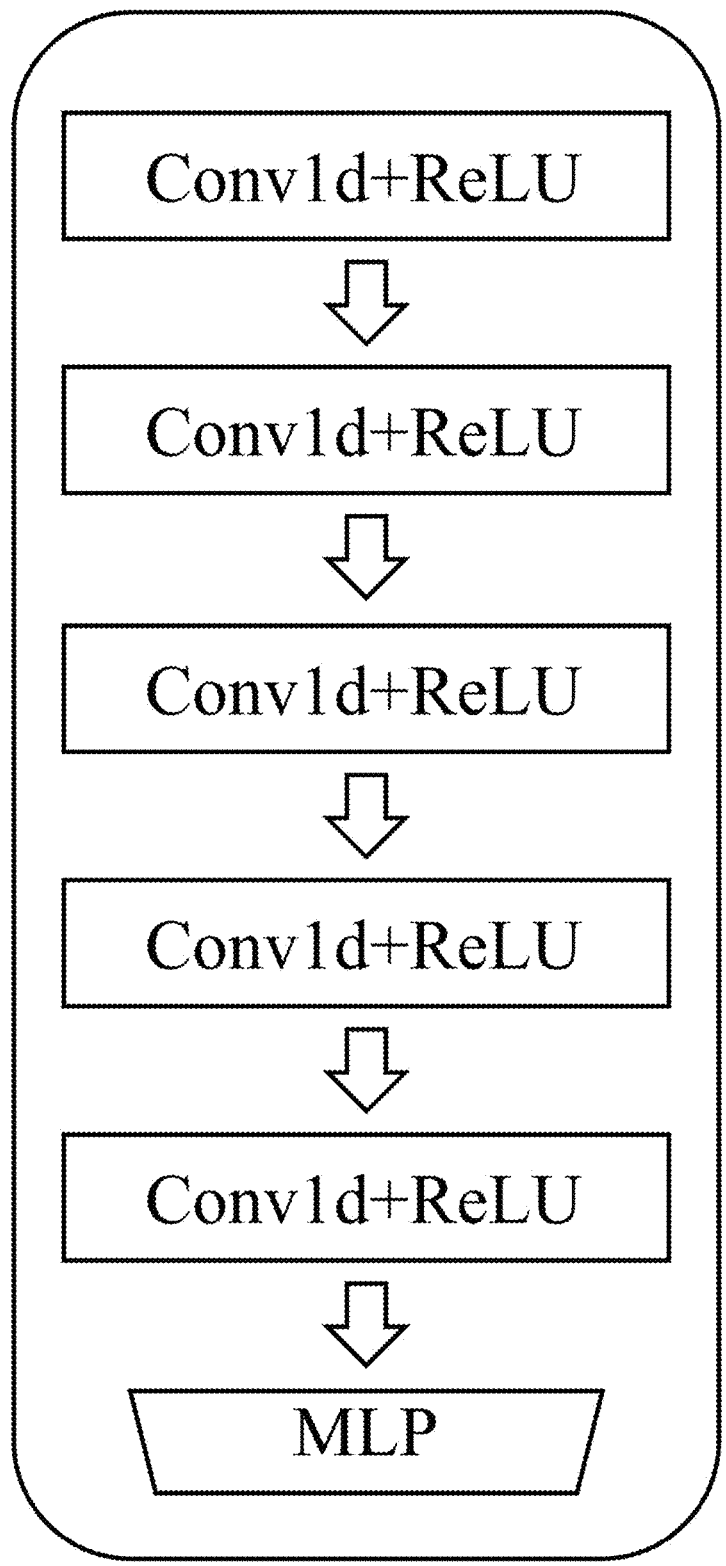
FIG. 3 is a schematic structural diagram of the second convolutional neural network and the third convolutional neural network in the Embodiment 1 of the present application.

In order to realize formulas (6) and (7), this embodiment constructs a second convolutional neural network Net2 and a third convolutional neural network Net3, which are used to acquire mappings $F_3$ (x) and $F_4$ (x) respectively. Net2 and Net3 have the same framework, as shown in FIG. 3. The input data are pure electromagnetic response field and pure induced polarization response field respectively, and the shapes are all (1×30). The output is layer thickness, resistivity or layer thickness and polarizability, and the lengths are all 2. The number of convolution kernels in the first layer is 64, and then, in order to fuse information, the number of convolution kernels in the next four layers is 32, 16, 8 and 4 in turn; the step length is 1, and the dilation length is 1. The outputs of five convolution layers are (64×30), (32×30), (16×30), (8×30) and (4×30) respectively. ReLU function is applied after each convolution layer to increase the representational capacity of neural network to nonlinearity. The last layer is MLP, which maps the output of the fifth convolution layer to layer thickness, resistivity (Net2) or layer thickness and polarizability (Net3). Although Net2 and Net3 have the same network framework, the internal weights w1 and w2 are different, and the acquired mappings are also different, namely:

$$\hat{h}, \hat{\rho} = \text{Net2}(w1, EM) \quad (8)$$

$$\hat{h}, \hat{m} = \text{Net3}(w2, IP) \quad (9)$$

where w1 and w2 are the weight matrices of the second neural network and the third neural network respectively, and $\hat{h}$, $\hat{\rho}$ and $\hat{m}$ are the predicted layer thickness, predicted resistivity and predicted polarizability respectively. Error back propagation algorithm is used to train the second neural network on the training set 2, and the weight matrix w1 is constantly updated, so that the error between $\hat{h}$, $\hat{\rho}$ and h, ρ meets the requirements, that is, formula (8) may fit the mapping $F_3$. Error back propagation algorithm is used to train the third neural network on the training set 3, and the weight matrix w2 is constantly updated, so that the error between $\hat{h}$, $\hat{m}$ and h, m meets the requirements, that is, formula (8) may fit the mapping $F_4$. Through training, the w1 and w2 acquired may make the second neural network and the third neural network acquire the mappings $F_3$ and $F_4$ respectively. Then the inversion of resistivity and polarization rate is completed, and multi-parameter information extraction is realized.

According to the application, the transient electromagnetic response influenced by the induced polarization effect is divided into a pure induced polarization field and a pure electromagnetic field, and multi-parameter information is extracted from the pure induced polarization field and the pure electromagnetic field respectively, which is an inversion method for multi-parameter electrical information of underground structures based on a deep neural network, and is suitable for the field of artificial source electromagnetic exploration of resources and energy such as metal mines, oil and gas, geothermal energy and the like.

Embodiment 2

Figure 4:
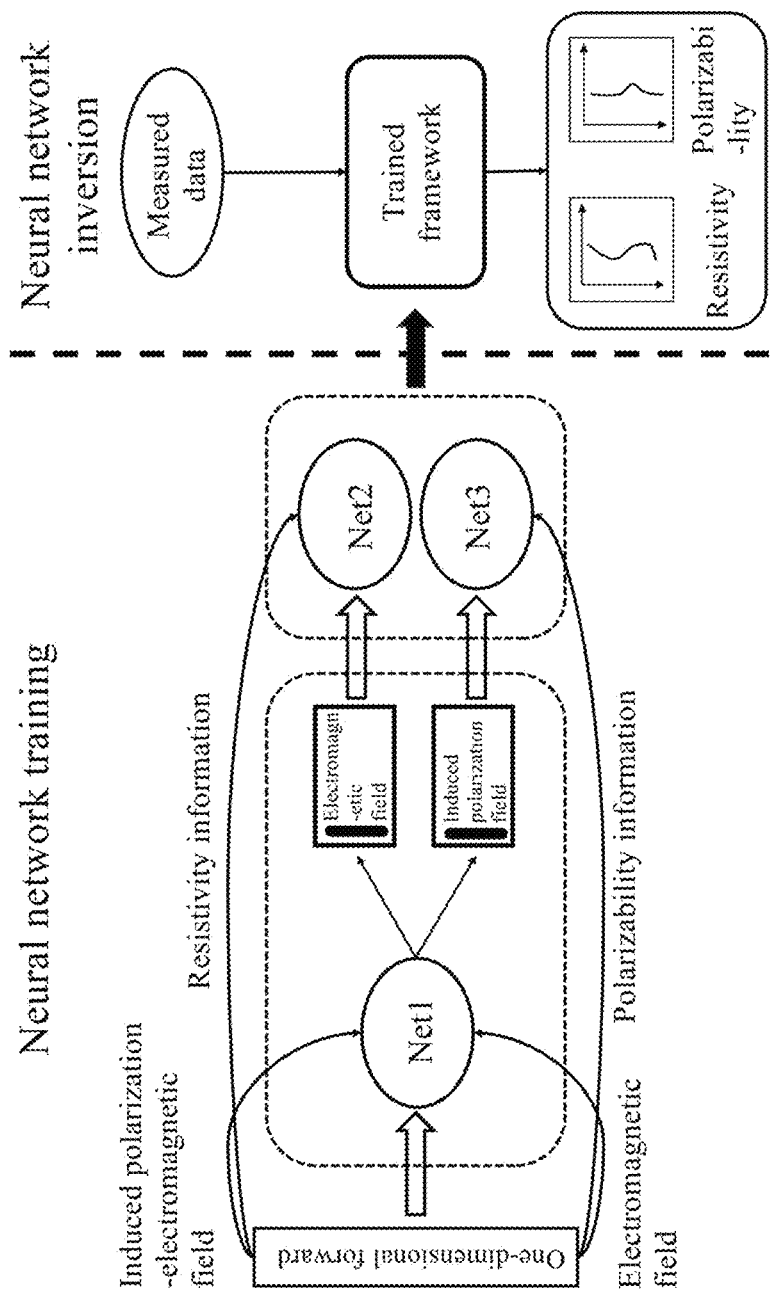
FIG. 4 is a schematic diagram of the overall technical route of electromagnetic data inversion influenced by the induced polarization effect in the Embodiment 2 of the present application.

As shown in FIG. 4, the overall technical route diagram of electromagnetic data inversion influenced by induced polarization effect by using the method for transient electromagnetic-induced polarization field separation and multi-parameter information extraction of the present application is mainly divided into two parts, one part is field separation-multi-parameter inversion framework training, and the other part is inversion of field measured data by using the trained framework.

First, the data set is constructed. According to the actual geological model, the parameters of the model are defined artificially as shown in Table 1.

TABLE 1

|  | Layer thickness(m) | Resistivity (Ωm) | Polarizability (%) | Time constant | Frequency correlation coefficient |
| --- | --- | --- | --- | --- | --- |
| First layer | 80 | 300 | 0 | 0 | 0 |
| Second layer | 30-50 | 1-125 | 1-80 | 1.0 | 0.2 |
| Third layer | — | 300 | 0 | 0 | 0 |

According to the parameter range in the table, the layer thickness, resistivity and polarization rate of the second stratum in a model are generated by a random method, and a geoelectric model is constructed. In the same way, 30,000 geoelectric models are constructed in this embodiment, which is recorded as model set 1. For this model set 1, in this embodiment, the polarizability, time constant and layer correlation coefficient of the second layer of each geoelectric model in it are all set to 0, and 30,000 models without polarization layer are obtained, which is recorded as model set 2. For each geoelectric model in model set 1, this embodiment uses a grounded conductor source transient electromagnetic device and introduces Cole-Cole polarization model. First, the frequency domain electromagnetic data is calculated, and then the frequency domain data is converted into the time domain through cosine transform to obtain the obtain transient electromagnetic data influenced by induced polarization, and the horizontal electric field influenced by the induced polarization effect is calculated, so as to obtain a data set containing 30,000 induced polarization-electromagnetic fields, which is recorded as data set 1; for model set 2, this embodiment adopts the same grounded conductor source transient electromagnetic method used in model set 1. Firstly, the frequency domain electromagnetic data is calculated, and then the frequency domain electromagnetic data is converted into the time domain through cosine transform to obtain the transient electromagnetic data influenced by induced polarization, and the horizontal electric fields of 30,000 models that are not influenced by induced polarization effect are calculated, so as to obtain a data set containing 30,000 pure electromagnetic fields, which is recorded as data set 2.

Next, before training the neural network, this embodiment constructs a training set. An induced polarization-electromagnetic field in the above data set 1 is used as input data, and the electromagnetic field in the corresponding data set 2 is used as a tag to construct an input data-tag pair. By applying the same method to each data in data set 1, 30,000 input data-tag pairs are obtained as training set 1. Training set 1 is used in the first part of the framework, namely field separation. The training set 1 is used to train the field separation neural network Net1, so that Net1 may acquire the mapping between induced polarization-electromagnetic field and electromagnetic field, and Net1 is trained to separate the electromagnetic field from the induced polarization-electromagnetic field, and then the induced polarization field is obtained by subtracting the electromagnetic field from the induced polarization-electromagnetic field.

An electromagnetic field in data set 2 is used as input data, and the thickness and resistivity of the second layer of the model in corresponding model set 2 are used as tags to obtain an input data-tag pair. Applying the same method to each electromagnetic field in data set 2, 30,000 input data-tag pairs are obtained to form the training set 2.

An induced polarization-electromagnetic field in data set 1 is subtracted from the corresponding electromagnetic field in data set 2 to obtain an induced polarization field as input data, and the layer thickness and polarizability of the model in model set 1 corresponding to the induced polarization-electromagnetic field are used as tags to construct an input data-tag pair. Applying the same method to each induced polarization-electromagnetic field in data set 1, 30,000 input data-tag pairs are obtained, forming the training set 3.

Training set 1 is used to separate the neural network, that is, the first convolutional neural network Net1, so that Net1 may acquire the mapping between the induced polarization-electromagnetic field and the electromagnetic field. Training set 2 is used to train resistivity inversion neural network, that is, the second convolutional neural network Net2, so that Net2 may acquire the mapping between the electromagnetic field and the resistivity. Training set 3 is used to train the polarizability inversion neural network, that is, the third convolutional neural network Net3, so that Net3 may acquire the mapping between the induced polarization field and the polarizability.

Figure 5A:
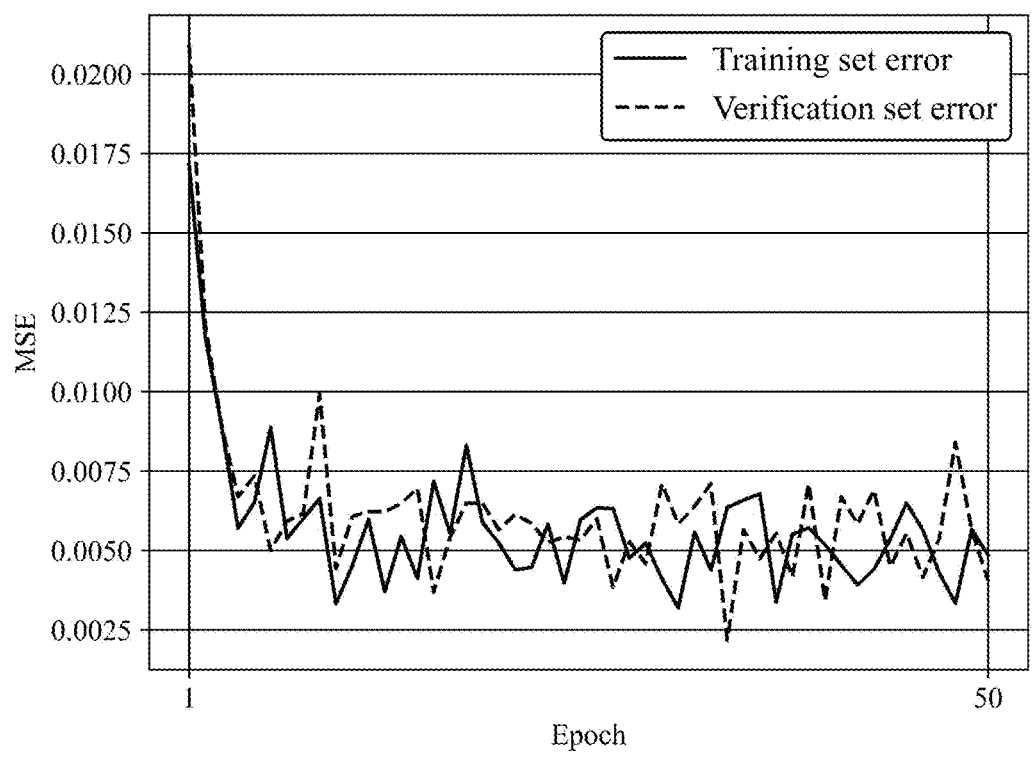
FIG. 5A is a schematic diagram of the trained neural network error attenuation curve of Net1 in the Embodiment 2 of the present application.
Figure 5B:
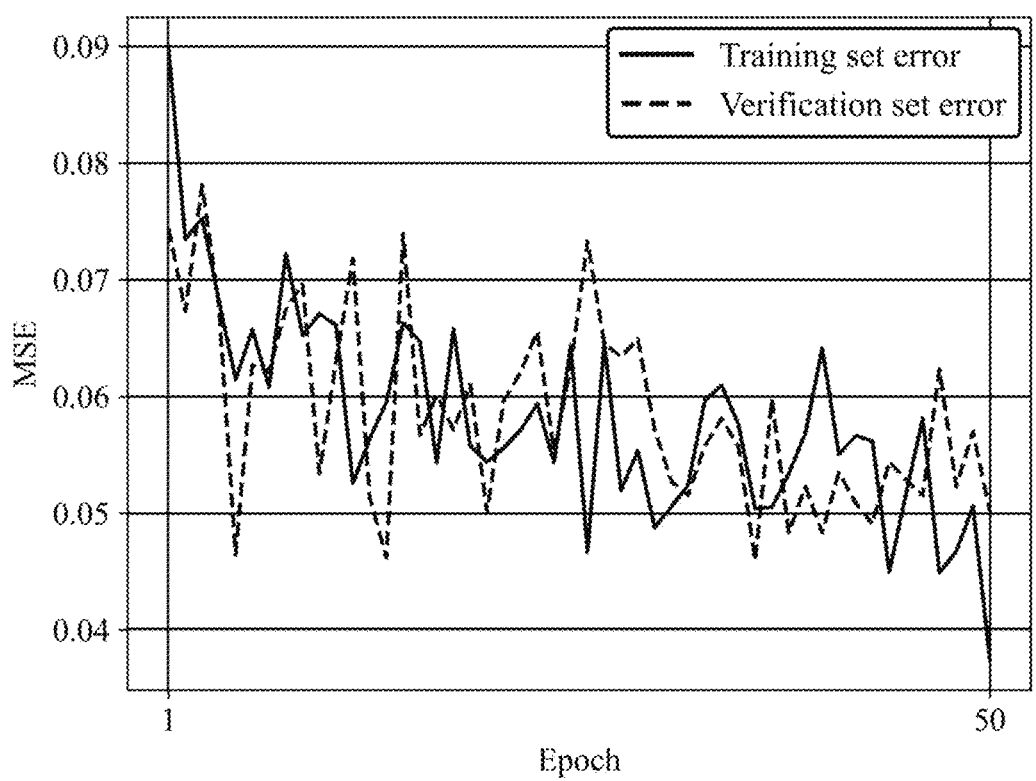
FIG. 5B is a schematic diagram of the trained neural network error attenuation curve of Net2 in the Embodiment 2 of the present application.
Figure 5C:
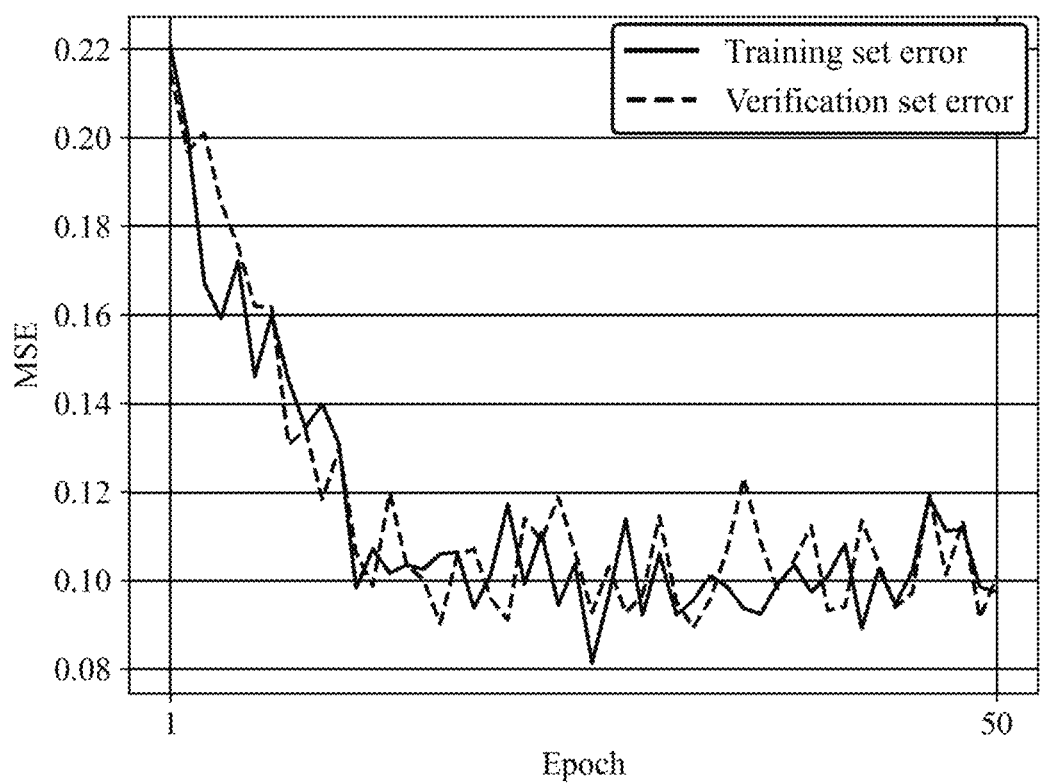
FIG. 5C is a schematic diagram of the trained neural network error attenuation curve of Net3 in the Embodiment 2 of the present application.

In this embodiment, the number of training rounds is set to 50 rounds, and the mean square error MSE is taken as the loss function, and the internal weights of the neural network are updated by error back propagation algorithm, so as to acquire the mapping between the input data and the tags to the greatest extent. The curve of the mean square errors of the three networks with the number of training rounds is shown in FIG. 5A, FIG. 5B and FIG. 5C, which are the error attenuation curves of Net1, Net2 and Net3 respectively. It can be seen that the training errors of the three neural networks gradually decrease with the number of training rounds, and finally all fluctuate around a small error, which shows that the three neural networks all have good convergence, indicating that neural networks have acquired the mapping between the input data and the tags, that is, Net1, Net2 and Net3 have acquired the mappings $F_1$ (x), $F_3$ (x) and $F_4$ (x) respectively. That is to say, the field separation-multi-parameter inversion framework has been trained.

For the trained framework, this embodiment constructs an H-type geoelectric model framework for testing. The model parameters are as follows:

$\rho_1 = 300$ ohm·m, $h_1 = 80$ m;

$\rho_2 = 125$ ohm·m, $h_2 = 25$ m;

$\rho_3 = 300$ ohm·m, $h_2 = 95$ m;

The second layer is set as a polarization layer, and the polarizability is 7.9%. The induced polarization-electromagnetic field on this model is calculated and input into the trained field separation-multi-parameter inversion framework for processing.

Figure 6:
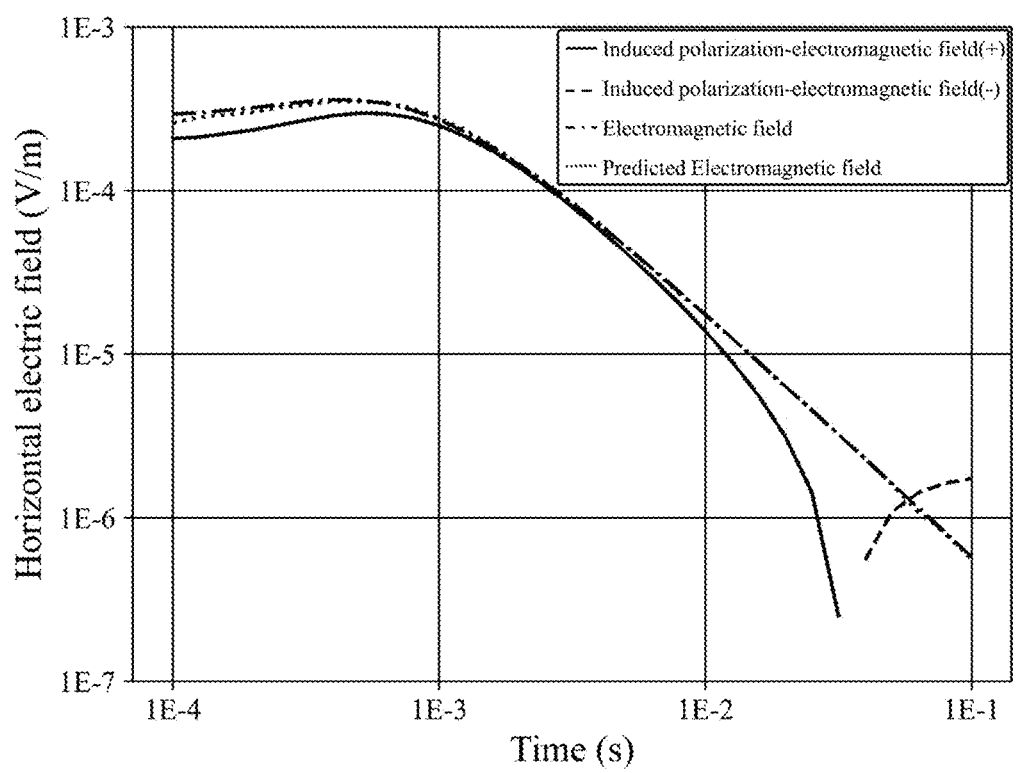
FIG. 6 is a schematic diagram of the electromagnetic field prediction result of Net1 in the Embodiment 2 of the present application.
Figure 7:
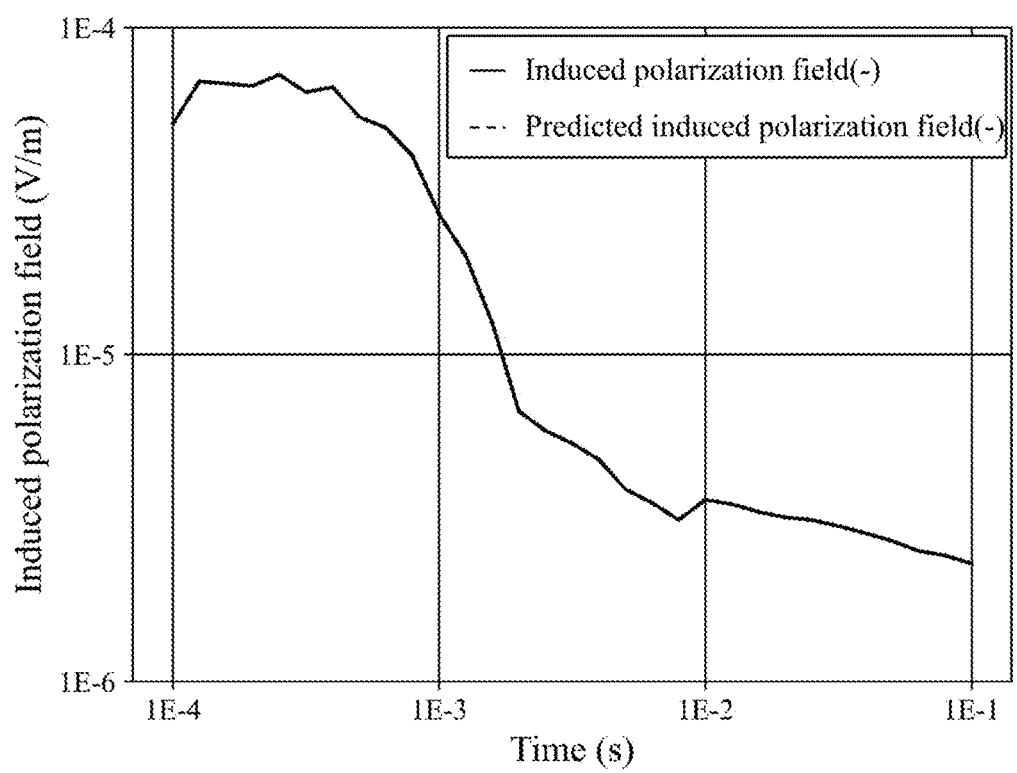
FIG. 7 is a schematic diagram of the induced polarization field prediction result of Net1 in the Embodiment 2 of the present application.

For Net1, the processing results are shown in FIGS. 6-7. It can be seen that the predicted electromagnetic field and the predicted induced polarization field are very accurate.

Figure 8:
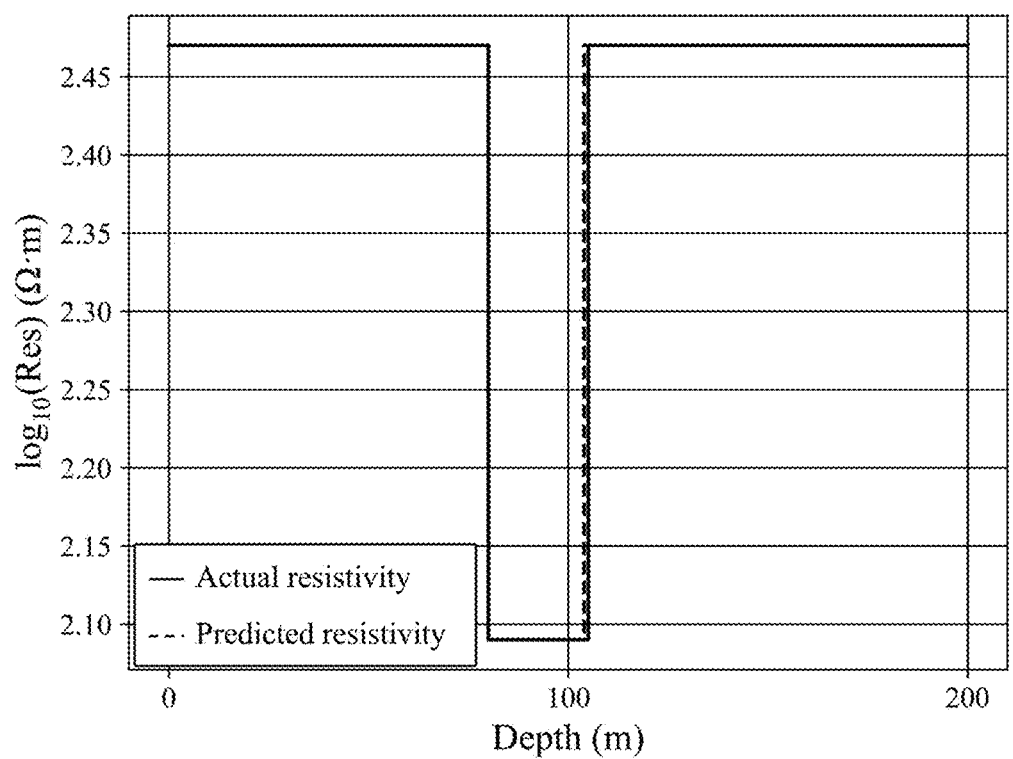
FIG. 8 is a schematic diagram of the resistivity structure prediction result of Net2 in the Embodiment 2 of the present application.
Figure 9:
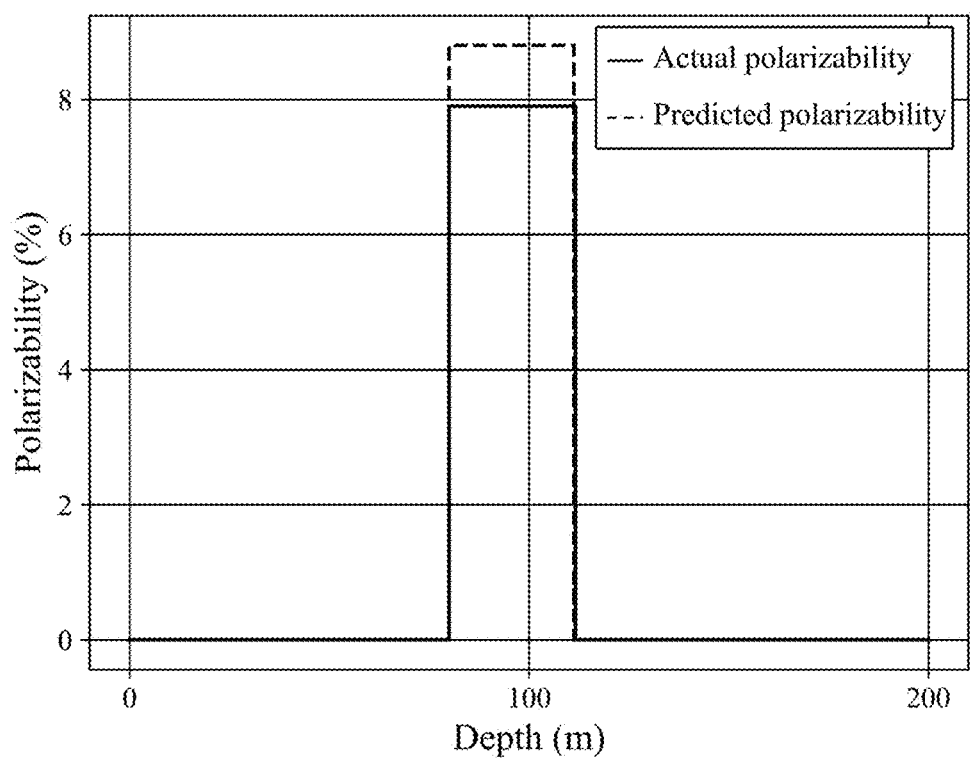
FIG. 9 is a schematic diagram of the polarizability structure prediction result of Net3 in the Embodiment 2 of the present application.

For Net2 and Net3, the inversion results are shown in FIG. 8 and FIG. 9 respectively. It can be seen that the inversion results of resistivity and polarizability are good.

Finally, the trained field separation-multi-parameter inversion framework is used to process the measured data. Firstly, the measured induced polarization-electromagnetic field is input into trained Net1, and the pure electromagnetic response field of underground structure is obtained after processing by Net1, and then the pure induced polarization response field is obtained by subtracting the pure induced polarization response field from the measured induced polarization-electromagnetic field, thus completing the field separation of the measured data. The obtained pure electromagnetic response field is input into the trained Net2 for processing, and the thickness and resistivity of the formation are obtained. The obtained pure induced polarization response field is input into trained Net3 for processing, and the thickness and polarization rate of the formation are obtained. The geoelectric parameters are extracted.

Embodiment 3

The Embodiment 3 is the specific application of the method for transient electromagnetic-induced polarization field separation and multi-parameter information extraction of the application to extract the polarizability information of the formation in Kalatongke copper-nickel ore concentration area in Xinjiang.

The Kalatongke copper-nickel ore concentration area in Xinjiang has the characteristics of strong magnetism, high density, high polarizability and low resistivity, which provides a powerful condition for deep learning and extraction of the induced polarization information. The electrical source transient electromagnetic method is used to collect data in the survey area of Kalatongke copper-nickel ore concentration area in Xinjiang. The survey line L103 is located in the southeast of the survey area, and the strike is perpendicular to the dilation direction of the vein. The transmitting and receiving distance of measuring line L103 is 1,000 m, and the fundamental frequency of electric field observation is 1 Hz. The length of the transmission line is 1.5 Km, the transmission current is 10 A, and the receiving electrode spacing is 40 m.

Figure 10:
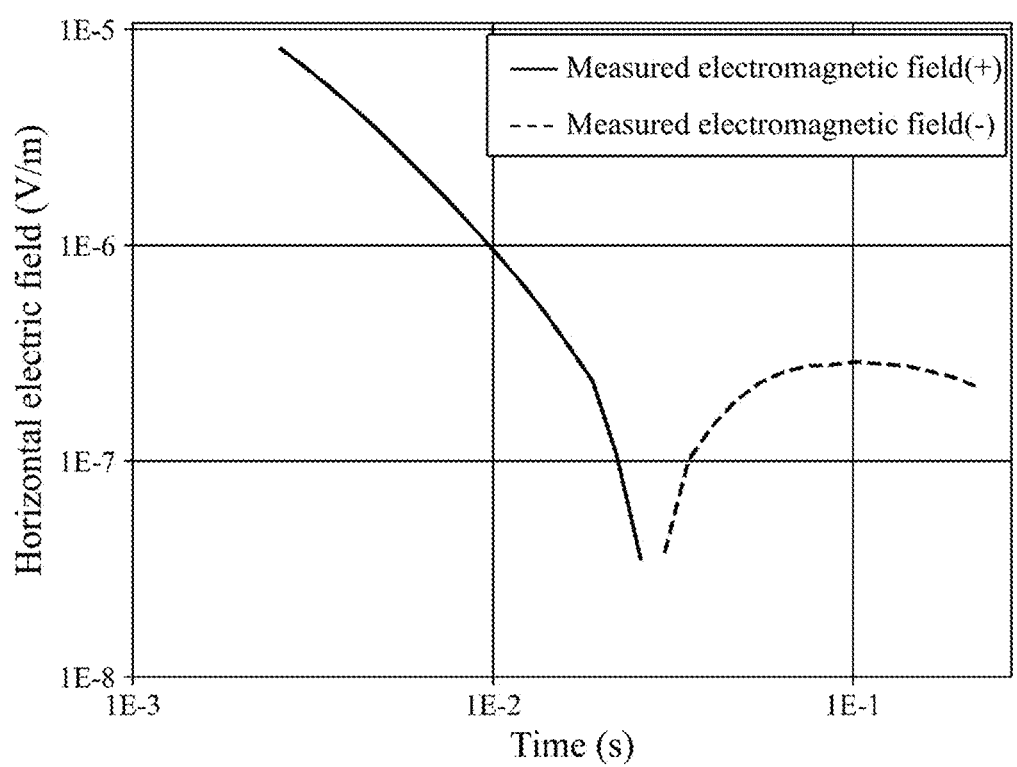
FIG. 10 is a schematic diagram of the measured comprehensive response attenuation curve of the measuring point in the Embodiment 3 of the present application.

In this embodiment, the measured electromagnetic-induced polarization response data of the measuring point located at 280 m are selected to predict the underground polarizability information. The measured comprehensive response attenuation curve of this measuring point is shown in FIG. 10. Due to the existence of carbonaceous tuff with high polarizability underground, the attenuation curve has obvious sign inversion.

Figure 11A:
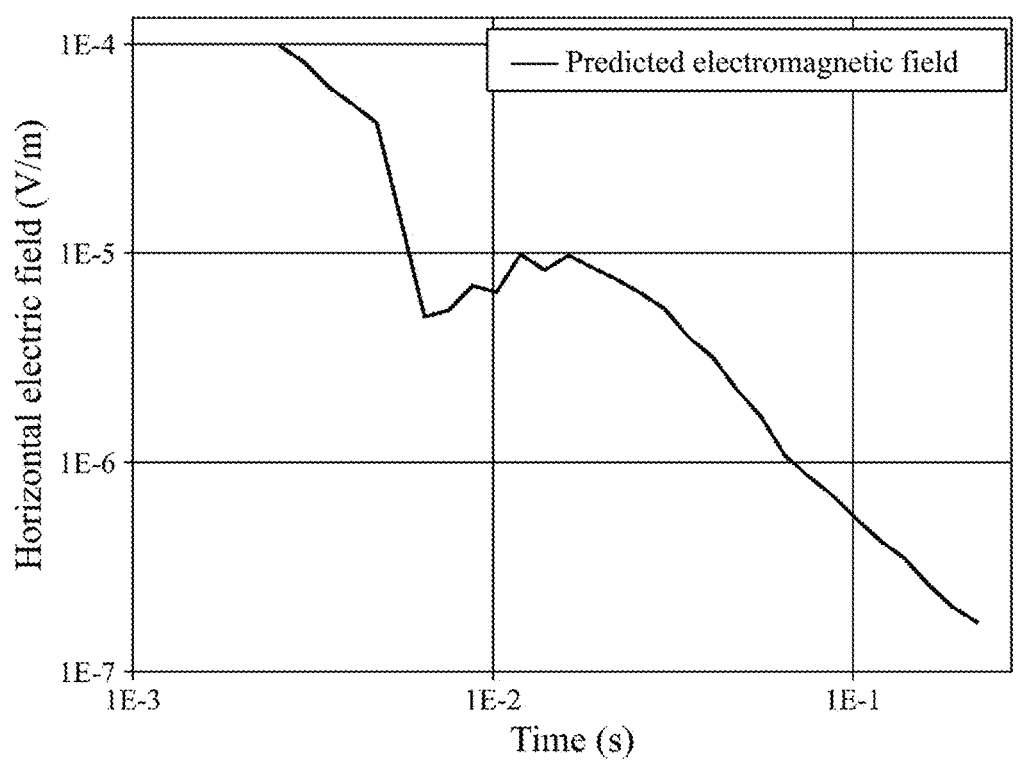
FIG. 11A is a schematic diagram of the pure electromagnetic response field separated in the Embodiment 3 of the present application.
Figure 11B:
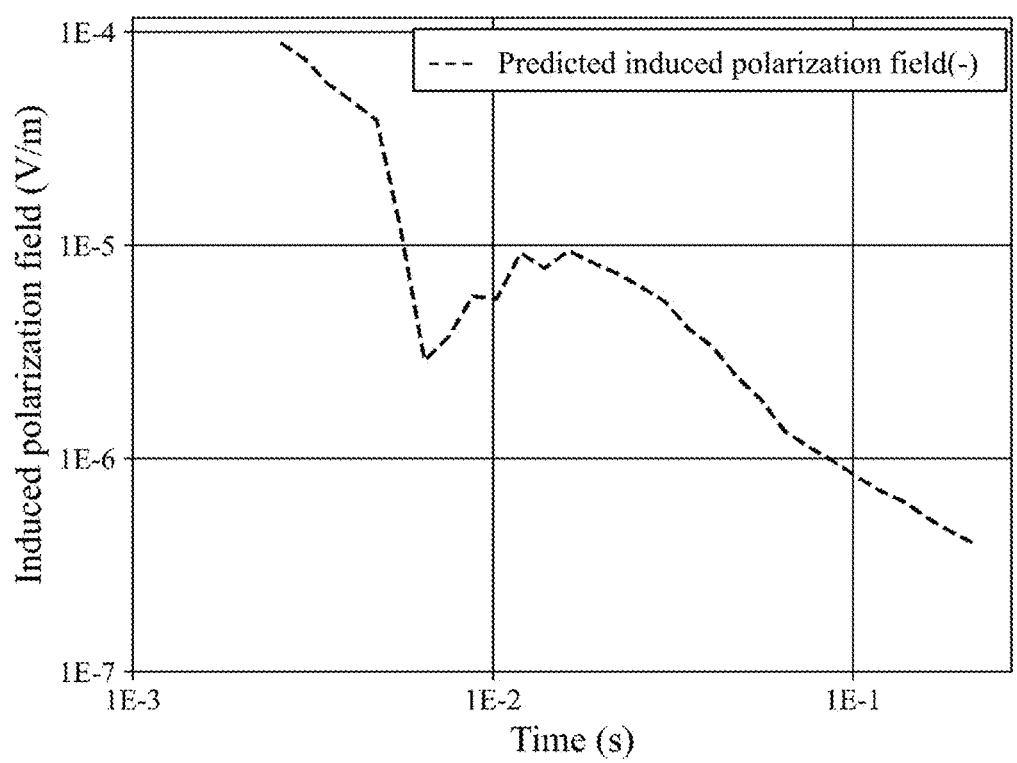
FIG. 11B is a schematic diagram of the pure induced polarization response field separated in the Embodiment 3 of the present application.

Taking the response of the measuring point as input, the trained field separation neural network Net1 is used to perform the separation of the electromagnetic field and the induced polarization field, and the separated pure electromagnetic field and pure induced polarization field are obtained, as shown in FIG. 11A and FIG. 11B. FIG. 11A shows the separated pure electromagnetic response field at this point, and FIG. 11B shows the pure induced polarization response field. The predicted attenuation characteristics of the two fields conform to the theoretical law.

Figure 12A:
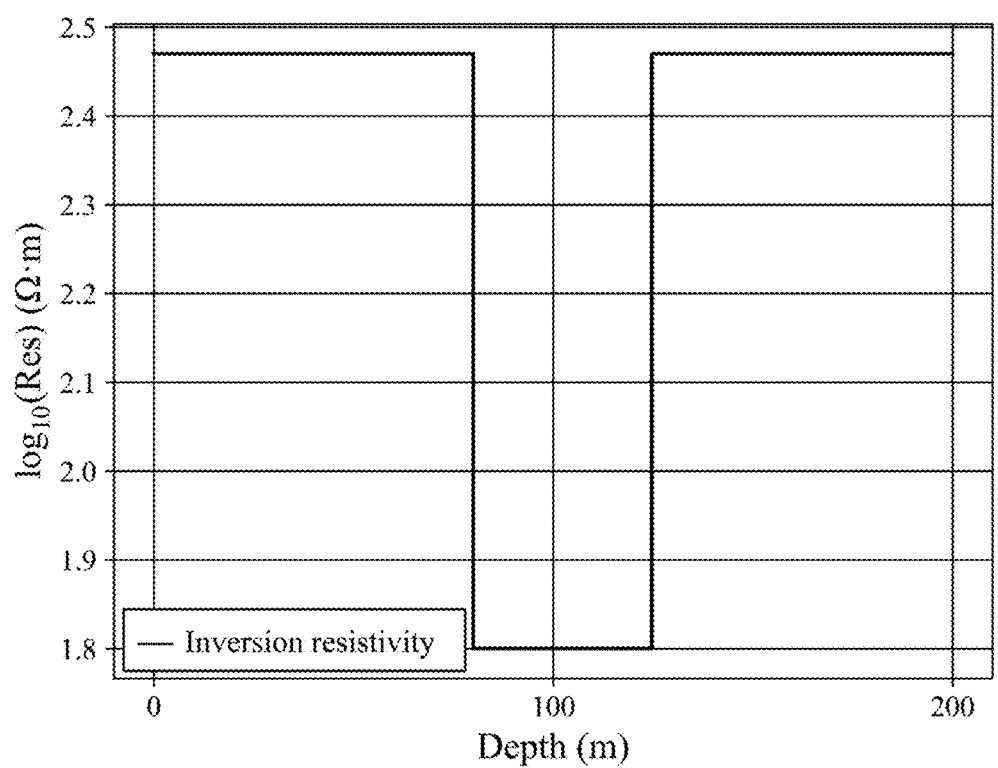
FIG. 12A is a schematic diagram of the resistivity profile in the multi-parameter inversion result of the Embodiment 3 of the present invention.
Figure 12B:
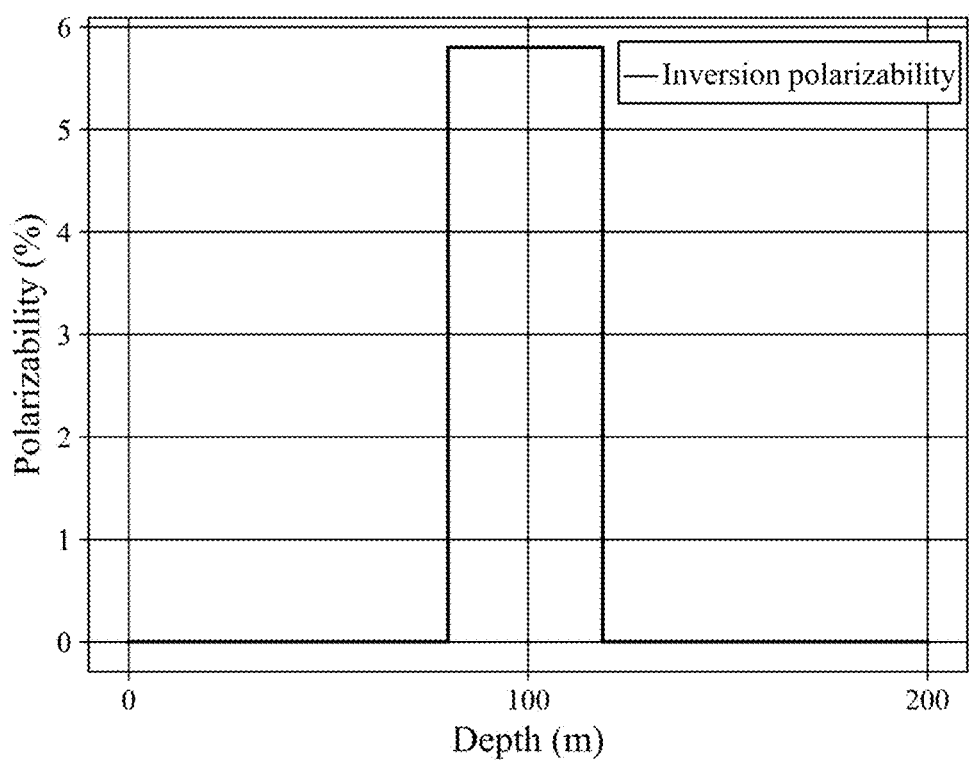
FIG. 12B is a schematic diagram of the polarizability profile in the multi-parameter inversion result of the Embodiment 3 of the present invention.

Next, the predicted pure electromagnetic response field and pure induced polarization response field are used as inputs respectively, which are processed by trained neural networks Net2 and Net3 respectively, and the underground resistivity and polarizability profiles are obtained by inversion respectively, as shown in FIG. 12A and FIG. 12B, where FIG. 12A is the schematic diagram of resistivity profile and FIG. 12A is the schematic diagram of polarizability profile.

Net2 inversion shows that the thickness of the low-resistance thin layer is 44 m and the resistivity is 63 Ωm; Net3 inversion shows that the layer thickness is 38 m and the polarization is 5.8%.

For the measured transient electromagnetic response of L103 measuring line at 280 m, the pure electromagnetic field and pure induced polarization field at this point are obtained through the processing of field separation-multi-parameter inversion framework, and the underground resistivity information and polarizability information are obtained by inversion. According to the inversion results, there is a low-resistance polarization layer with a thickness of about 40 m at the depth of 80 m. Comparing the inversion results with the drilling formation information shown in FIG. 13, it can be seen that the physical parameters of the low-resistivity polarization layer obtained by inversion are consistent with those of the carbonaceous sedimentary tuff layer, which verifies the effectiveness and accuracy of the field separation-multi-parameter inversion framework.

Embodiment 4

Figure 14:
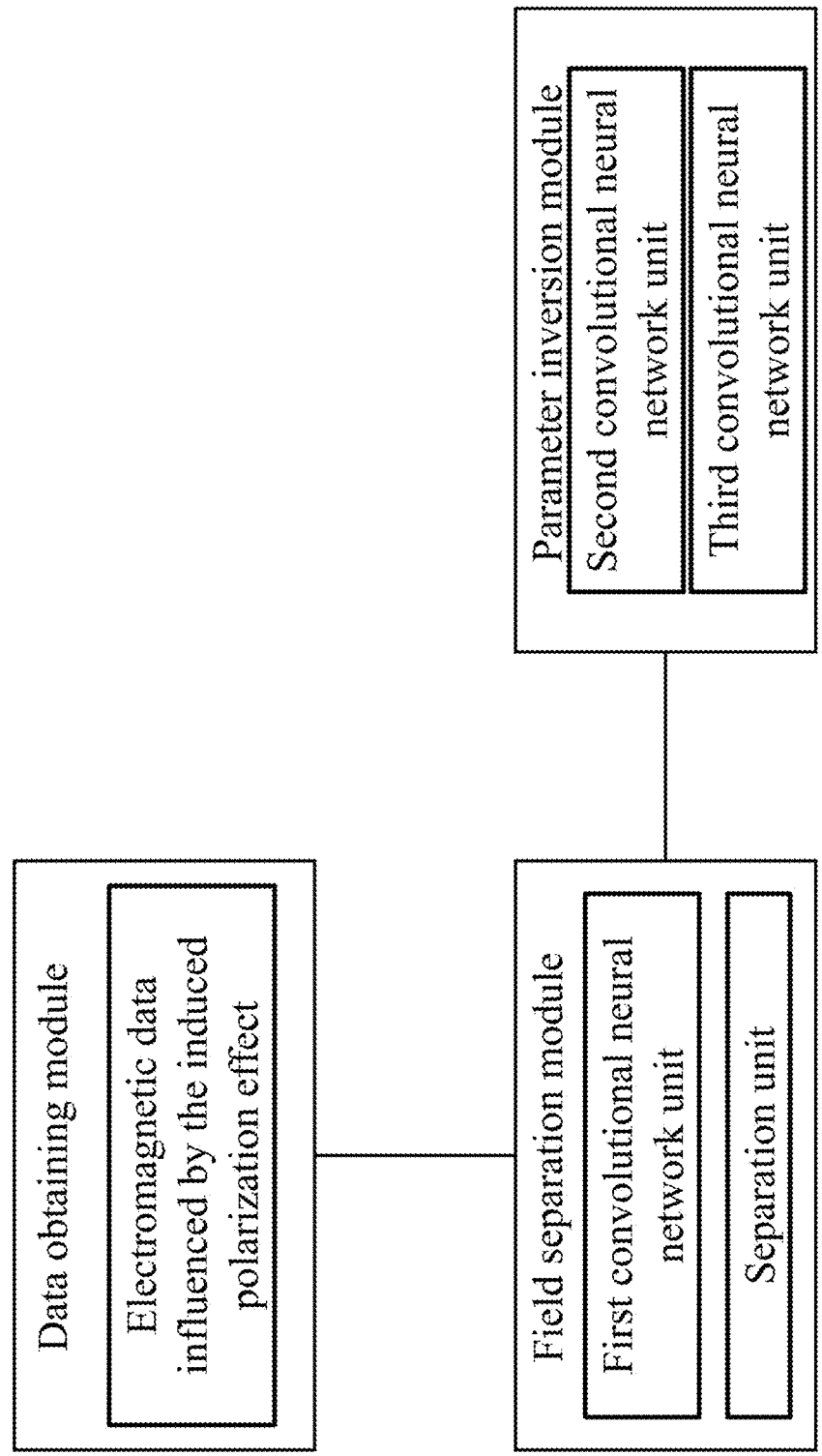
FIG. 14 is a schematic structural diagram of a system for transient electromagnetic-induced polarization field separation and multi-parameter information extraction according to the Embodiment 4 of the present application.

FIG. 14 is a schematic structural diagram of the system for transient electromagnetic-induced polarization field separation and multi-parameter information extraction according to the Embodiment 4 of the present application, which mainly includes a data obtaining module, a field separation module and a parameter inversion module.

Specifically, in this embodiment, the data obtaining module is used for obtaining electromagnetic data influenced by the induced polarization effect, and the electromagnetic data influenced by the induced polarization effect is induced polarization-electromagnetic field data to be processed.

The field separation module is used for performing a separating treatment of the induced polarization field and the electromagnetic field on the electromagnetic data influenced by the induced polarization effect to obtain the pure electromagnetic response field and the pure induced polarization response field.

The parameter inversion module is used for respectively performing a multi-parameter information inversion based on the pure electromagnetic response field and the pure induced polarization response field to complete the extraction of the geoelectric parameters, where the geoelectric parameters include the predicted layer thickness, the predicted resistivity and the predicted polarizability.

Specifically, in this embodiment, the field separation module consists of a first convolutional neural network unit and a separation unit. The first convolutional neural network unit is used for obtaining the pure electromagnetic response field by a separation from the induced polarization-electromagnetic field data. The separation unit is used to subtract the pure electromagnetic response field from the induced polarization-electromagnetic field data to obtain the pure induced polarization response field.

The first convolutional neural network is arranged in the first convolutional neural network unit, and has seven layers in total, where the first layer is Conv1d+ReLU, the second to sixth layers are Conv1d+BN+ReLU, and the seventh layer is Conv1d. The numbers of convolution kernels in the one-dimensional convolution layer from the first layer to the sixth layer of the first convolutional neural network are all 64, the convolution kernel lengths are all 3, the convolution step lengths are all 1, and the dilation step lengths are all 1. The number of the convolution kernels in the seventh layer is 1, the convolution kernels length is 3, the convolution step length is 1, and the dilation step length is 1.

Specifically, in this embodiment, the parameter inversion module consists of a second convolutional neural network unit and a third convolutional neural network unit. A second convolutional neural network is arranged in the second convolutional neural network unit, and the second convolutional neural network unit is used for obtaining the predicted layer thickness and the predicted resistivity based on the pure electromagnetic response field and the second convolutional neural network. The third convolutional neural network is arranged in the third convolutional neural network unit, and the third convolutional neural network unit is used for predicting the layer thickness and the polarizability based on the pure induced polarization response field and the third convolutional neural network.

In this embodiment, the structures of the second convolutional neural network and the third convolutional neural network are same, where the first to fifth layers are Conv1d+ReLU, the number of convolutional kernels is 64, 32, 16, 8 and 4 in turn, the step lengths are all 1, and the dilation lengths are all 1. The sixth layer is MLP.

The above is only the preferred embodiments of this application, but the protection scope of this application is not limited to this. Any change or replacement obvious to those skilled in the art within the technical scope disclosed in this application should be included in the protection scope of this application. Therefore, the protection scope of this application should be defined by the protection scope of the claims.

What is claimed is:

1. A method for transient electromagnetic-induced polarization field separation and multi-parameter information extraction, comprising following steps:
   S1, obtaining electromagnetic data influenced by an induced polarization effect, wherein the electromagnetic data influenced by the induced polarization effect is induced polarization-electromagnetic field data;
   S2, performing a separating treatment of an induced polarization field and an electromagnetic field on the electromagnetic data influenced by the induced polarization effect, to obtain a pure electromagnetic response field and a pure induced polarization response field; and
   S3, based on the pure electromagnetic response field and the pure induced polarization response field, respectively performing a multi-parameter information inversion to complete an extraction of geoelectric parameters, wherein the geoelectric parameters comprise a predicted layer thickness, a predicted resistivity and a predicted polarizability;
   wherein the S2 specifically comprises:
   constructing a first convolutional neural network;
   obtaining the pure electromagnetic response field by a separation from the induced polarization-electromagnetic field data based on the first convolutional neural network; specifically:
   recording the induced polarization-electromagnetic field data as EMIP, and recording the pure electromagnetic response field and the pure induced polarization response field as EM and IP respectively; and according to an electromagnetic induction principle and the induced polarization effect, obtaining:

$$EMIP=EM+IP \quad\quad 1$$

wherein due to different geoelectric models, the EMIP, the EM and the IP are all different, so mappings between the EMIP and the EM, or between the EMIP and the IP are nonlinear, and two kinds of the mappings are recorded as $F_1(x)$ and $F_2(x)$ respectively, satisfying:

$$EM=F_1(EMIP) \quad\quad 2$$

$$I=F_2(EMIP) \quad\quad 3$$

selecting the mapping $F_1(x)$ as a mapping to be learned, obtaining the EM from the EMIP by formula 2, and then obtaining the IP by formula 1, realizing a field separation, that is, the pure electromagnetic response field, and recording as $\widehat{EM}$, $$\widehat{EM}=\text{Net1}(w,EMIP) \quad\quad 4$$

wherein w is a parameter matrix to be learned;
subtracting the pure electromagnetic response field from the induced polarization-electromagnetic field data to obtain the pure induced polarization response field, and completing the separating treatment of the induced polarization field and the electromagnetic field, specifically:
obtaining a predicted induced polarization field from the formula 1, that is, the pure induced polarization response field, and recording as $\widehat{EM}$, $$\widehat{EM}=EMIP-\widehat{EM}=EMIP-\text{Net1}(w,EMIP) \quad\quad 5$$

so as to separate the induced polarization field and the electromagnetic field from the induced polarization-electromagnetic field.

2. The method for transient electromagnetic-induced polarization field separation and multi-parameter information extraction according to claim 1, wherein
   the first convolutional neural network has altogether seven layers, wherein a first layer is Conv1d+ReLU, second to sixth layers are Conv1d+BN+ReLU, and a seventh layer is Conv1d;
   numbers of convolution kernels in a one-dimensional convolution layer from the first layer to the sixth layer of the first convolutional neural network are all 64, convolution kernel lengths are all 3, convolution step lengths are all 1, and dilation step lengths are all 1; and
   a number of the convolution kernels in the seventh layer of the first convolutional neural network is 1, the convolution kernels length is 3, the convolution step length is 1, and the dilation step length is 1.

3. The method for transient electromagnetic-induced polarization field separation and multi-parameter information extraction according to claim 1, wherein
   in the S3, a method for performing the multi-parameter information inversion comprises:
   constructing a second convolutional neural network and a third convolutional neural network;
   obtaining the predicted layer thickness and the predicted resistivity based on the pure electromagnetic response field and the second convolutional neural network; and
   obtaining the predicted layer thickness and the predicted polarizability based on the pure induced polarization response field and the third convolutional neural network.

4. The method for transient electromagnetic-induced polarization field separation and multi-parameter information extraction according to claim 3, wherein structures of the second convolutional neural network and the third convolutional neural network are same, wherein first to fifth layers are all Conv1d+ReLU, and a sixth layer is MLP; and numbers of the convolution kernels from the first layer to the fifth layer of the second convolutional neural network and the third convolutional neural network are 64, 32, 16, 8 and 4 in sequence, and the step lengths are all 1, and the dilation lengths are all 1.

5. A system for transient electromagnetic-induced polarization field separation and multi-parameter information extraction, comprising a data obtaining module, a field separation module and a parameter inversion module;

wherein the data obtaining module is used for obtaining electromagnetic data influenced by an induced polarization effect, and the electromagnetic data influenced by the induced polarization effect is induced polarization-electromagnetic field data;

the field separation module is used for separating an induced polarization field and an electromagnetic field from the electromagnetic data influenced by the induced polarization effect, to obtain a pure electromagnetic response field and a pure induced polarization response field;

the parameter inversion module is used for respectively performing a multi-parameter information inversion based on the pure electromagnetic response field and the pure induced polarization response field to extract geoelectric parameters, wherein the geoelectric parameters comprise a predicted layer thickness, a predicted resistivity and a predicted polarizability;

wherein the field separation module comprises a first convolutional neural network unit and a separation unit;

the first convolutional neural network unit is used for separating from the induced polarization-electromagnetic field data and obtaining the pure electromagnetic response field; specifically, recording the induced polarization-electromagnetic field data as EMIP, and recording the pure electromagnetic response field and the pure induced polarization response field as EM and IP respectively; according to an electromagnetic induction principle and the induced polarization effect, obtaining:

$$EMIP = EM + IP \qquad 1$$

due to different geoelectric models, the EMIP, the EM and the IP are all different, so mappings between the EMIP and the EM, or between the EMIP and the IP are nonlinear, and two kinds of the mappings are recorded as $F_1(x)$ and $F_2(x)$ respectively, satisfying:

$$EM = F_1(EMIP) \qquad 2$$

$$IP = F_2(EMIP) \qquad 3$$

selecting the mapping $F_1(x)$ as a mapping to be learned, obtaining the EM from the EMIP by formula 2, and then obtaining the IP by formula 1, and realizing a field separation, that is, the pure electromagnetic response field recorded as $\widehat{EM}$, $$\widehat{EM} = Net1(w, EMIP) \qquad 4$$

wherein w is a parameter matrix to be learned;

the separation unit is used for subtracting the pure electromagnetic response field from the induced polarization-electromagnetic field data to obtain the pure induced polarization response field; specifically, the predicted induced polarization field, that is, the pure induced polarization response field, is obtained by using the formula 1 and recorded as $\widehat{IP}$, $$\widehat{IP} = EMIP - \widehat{EM} = EMIP - Net1(w, EMIP) \qquad 5$$

6. The system for transient electromagnetic-induced polarization field separation and multi-parameter information extraction according to claim 5, wherein a first convolutional neural network is arranged in the first convolutional neural network unit;

the first convolutional neural network comprises of altogether seven layers, wherein a first layer is Conv1d+ReLU, second to sixth layers are Conv1d+BN+ReLU, and a seventh layer is Conv1d;

numbers of convolution kernels in a one-dimensional convolution layer from the first layer to the sixth layer of the first convolutional neural network are all 64, convolution kernel lengths are all 3, convolution step lengths are all 1, and dilation step lengths are all 1; and a number of the convolution kernels in the seventh layer of the first convolutional neural network is 1, the convolution kernels length is 3, the convolution step length is 1, and the dilation step length is 1.

7. The system for transient electromagnetic-induced polarization field separation and multi-parameter information extraction according to claim 5, wherein the parameter inversion module comprises a second convolutional neural network unit and a third convolutional neural network unit;

a second convolutional neural network is arranged in the second convolutional neural network unit, and the second convolutional neural network unit is used for obtaining the predicted layer thickness and the predicted resistivity based on the pure electromagnetic response field and the second convolutional neural network; and a third convolutional neural network is arranged in the third convolutional neural network unit, and the third convolutional neural network unit is used for obtaining the predicted layer thickness and the predicted polarizability based on the pure induced polarization response field and the third convolutional neural network.

8. The system for transient electromagnetic-induced polarization field separation and multi-parameter information extraction according to claim 7, wherein structures of the second convolutional neural network and the third convolutional neural network are same, wherein the first to fifth layers are all Conv1d+ReLU, numbers of the convolution kernels are 64, 32, 16, 8 and 4 in sequence, the step lengths are all 1, the dilation lengths are all 1, and the sixth layer is MLP.

* * * * *